US012164106B2

(12) United States Patent
Phelan et al.

(10) Patent No.: US 12,164,106 B2
(45) Date of Patent: Dec. 10, 2024

(54) DEVICE FOR AUGMENTED REALITY OR VIRTUAL REALITY DISPLAY

(71) Applicant: Snap Inc., Santa Monica, CA (US)

(72) Inventors: Ciaran Phelan, Abingdon (GB); Sophia Antonia Fox, Abingdon (GB); Mohmed Salim Valera, Abingdon (GB); Arseny Alexeev, Abingdon (GB)

(73) Assignee: Snap Inc., Santa Monica, CA (US)

( * ) Notice: Subject to any disclaimer, the term of this patent is extended or adjusted under 35 U.S.C. 154(b) by 559 days.

(21) Appl. No.: 17/287,479

(22) PCT Filed: Jul. 24, 2019

(86) PCT No.: PCT/GB2019/052075
§ 371 (c)(1),
(2) Date: Apr. 21, 2021

(87) PCT Pub. No.: WO2020/084275
PCT Pub. Date: Apr. 30, 2020

(65) Prior Publication Data
US 2021/0382308 A1 Dec. 9, 2021

(30) Foreign Application Priority Data
Oct. 24, 2018 (GB) ...................... 1817310

(51) Int. Cl.
G02B 27/01 (2006.01)
F21V 8/00 (2006.01)
(52) U.S. Cl.
CPC ....... *G02B 27/0172* (2013.01); *G02B 6/0023* (2013.01); *G02B 6/005* (2013.01)
(58) Field of Classification Search
CPC .... G02B 6/005; G02B 6/0023; G02B 6/0026; G02B 6/0076; G02B 27/017;
(Continued)

(56) References Cited

U.S. PATENT DOCUMENTS 10,838,132 B1 * 11/2020 Calafiore ............. G02B 6/0015
2018/0172995 A1    6/2018 Lee et al.
(Continued)

FOREIGN PATENT DOCUMENTS

CN         108873350         11/2018
WO     WO-2016020643 A1      2/2016
(Continued)

OTHER PUBLICATIONS

International Search Report and Written Opinion dated Oct. 30, 2019 for international application PCT/GB2019/052075.
(Continued)

*Primary Examiner* — Sultan Chowdhury
(74) *Attorney, Agent, or Firm* — Schwegman Lundberg & Woessner, P.A.

(57) ABSTRACT

An optical structure is disclosed for use in an augmented reality display. The structure includes a waveguide (52) and an input diffractive optical structure (54) configured to receive light from a projector and couple the received light into the waveguide (52). An output diffractive optical structure (60) is configured to receive light from the input diffractive optical element (54) in an input direction, wherein the output diffractive optical structure comprises at least a first diffractive optical element (30) and a second diffractive optical element (32) with different respective diffraction efficiencies, wherein the first diffractive optical element has a relatively high diffraction efficiency and the second diffractive optical element has a relatively low diffraction efficiency and the first and second diffractive optical elements are overlaid on one another in or on the waveguide. The output diffractive optical structure (60) comprises a first portion (62) and a second portion (64). In the first portion (62) the first diffractive optical element is configured to couple light from the input direction towards (Continued)

the second portion (64) and the second diffractive optical element is configured to couple light from the input direction away from the second portion. In the second portion (64) the first diffractive optical element is configured to couple light from the input direction towards the first portion (62) and the second diffractive optical element is configured to couple light from the input direction away from the first portion (62).

20 Claims, 7 Drawing Sheets

(58) Field of Classification Search
CPC ............ G02B 27/0101; G02B 27/0172; G02B 27/0081; G02B 27/4205; G02B 2027/0112; G02B 2027/01163; G02B 2027/0123; G02B 2027/0125; G02B 2027/0178; G02B 5/1819; G02B 5/1823; G02B 5/1866
See application file for complete search history.

(56) References Cited

U.S. PATENT DOCUMENTS

| | | |
|---|---|---|
| 2018/0210146 A1 | 7/2018 | Klug et al. |
| 2018/0299678 A1* | 10/2018 | Singer ................... G02B 6/005 |
| 2020/0116997 A1* | 4/2020 | Lee ...................... G02B 6/0076 |
| 2020/0278543 A1* | 9/2020 | Schultz ................. G02B 6/005 |
| 2020/0292840 A1* | 9/2020 | Popovich ............ G02B 6/0016 |

FOREIGN PATENT DOCUMENTS

| | | |
|---|---|---|
| WO | 2018178626 | 10/2018 |
| WO | 2020084275 | 4/2020 |

OTHER PUBLICATIONS

"International Application Serial No. PCT/GB2019/052075, International Preliminary Report on Patentability mailed May 6, 2021", 8 pgs.

"Chinese Application Serial No. 2019800692.4, Office Action mailed Nov. 11, 2022", w/ English Translation, 12 pgs.

\* cited by examiner

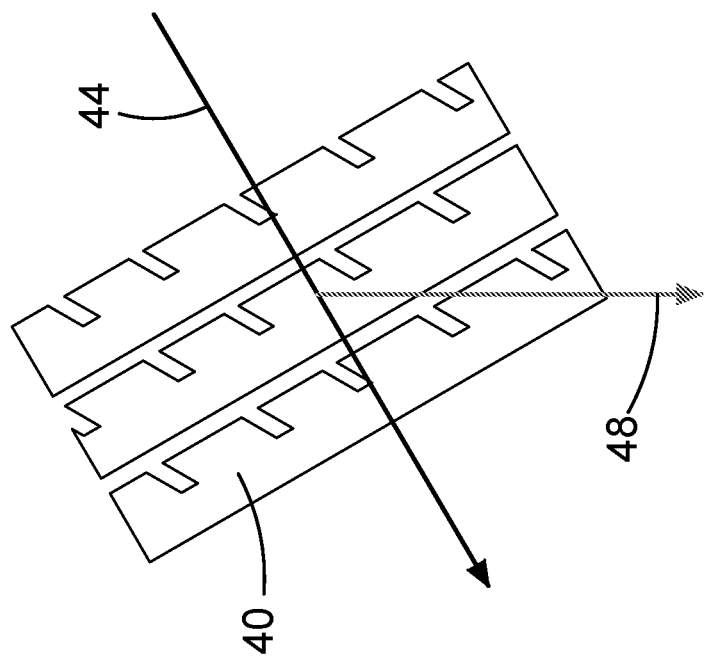
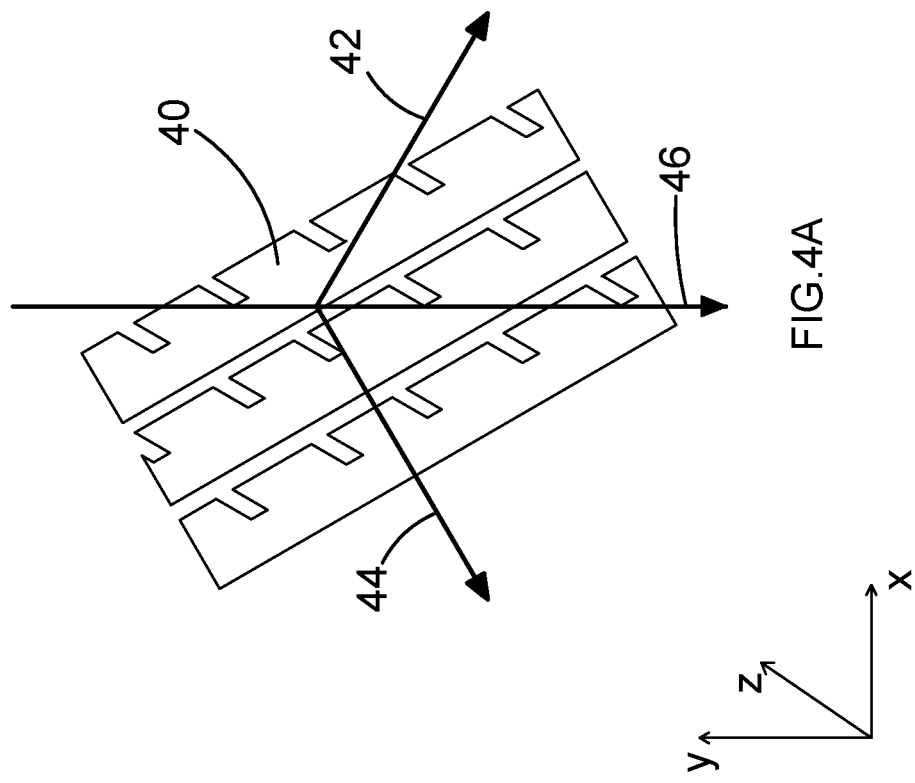
FIG.4A
FIG.4B

DEVICE FOR AUGMENTED REALITY OR VIRTUAL REALITY DISPLAY

This application is a national stage filing under 35 U.S.C. § 371 of International Patent Application No. PCT/GB2019/052075, filed Jul. 24, 2019, which claims priority to Great Britain application 1817310.4 filed Oct. 24, 2018, each of which is incorporated by reference herein in its entirety.

The present invention relates to a device for use in an augmented reality or virtual reality display such as a headset or a head-up display. In particular, the invention relates to a waveguide that provides an improved optical efficiency in an output diffractive optical element that can simultaneously expand light in two-dimensions and couple it out of the waveguide for viewing by a user.

An augmented reality display allows a user to view their surroundings as well as projected images. In military or transportation applications the projected images can be overlaid on the real world perceived by the user. Other applications for these displays include video games and wearable devices, such as glasses. By contrast, in a virtual reality display a user can only perceive projected images and light from their real world surroundings is obscured.

In a normal augmented reality set-up a transparent display screen is provided in front of a user so that they can continue to see the physical world. The display screen is typically a glass waveguide, and a projector is provided to one side. Light from the projector is coupled into the waveguide by a diffraction grating (an input grating). The projected light is totally internally reflected within the waveguide. The light is then coupled out of the waveguide by another diffraction grating (an output grating) so that it can be viewed by a user. The projector can provide information and/or images that augment a user's view of the physical world.

An optical device is disclosed in WO 2016/020643 for expanding input light in two dimensions in an augmented reality display. An input diffractive optical element is provided for coupling input light from a projector into a waveguide. The optical device also includes an output element having two diffractive optical elements overlaid on one another in the waveguide so that each of the two diffractive optical elements can receive light from the input diffractive optical element and couple it towards the other diffractive optical element in the pair, which can then act as an output diffractive optical element which couples light out of the waveguide towards a viewer. In one embodiment the two diffractive optical elements overlaid on one another are provided in a photonic crystal. This is achieved by having an array of pillars arranged within or on the surfaces the waveguide, having an increased refractive index relative to the surrounding waveguide medium. The pillars in WO 2016/020643 are described as having a circular cross-sectional shape when viewed in the plane of the waveguide, from the perspective of a viewer. This arrangement has been found to be very effective at simultaneously expanding light in two dimensions and coupling light out of the waveguide. Advantageously this can improve the use of space on the waveguide. However, it has been found that this arrangement can also produce some light paths that offer expansion within the waveguide without any outcoupling towards a viewer. This can produce some inefficiency and it would be desirable to improve this arrangement in order to increase optical efficiency (i.e. optical power received at a user's eye versus optical power input to the system from a projector). An object of the present invention is to provide an optical device that can expand light in two dimensions in an augmented reality display with increased optical efficiency.

According to an aspect of the present invention there is provided an optical structure for use in an augmented reality or virtual reality display, comprising: a waveguide; an input diffractive optical structure configured to receive light from a projector and couple the received light into the waveguide; an output diffractive optical structure configured to receive light from the input diffractive optical element in an input direction, wherein the output diffractive optical structure comprises at least a first diffractive optical element and a second diffractive optical element with different respective diffraction efficiencies, wherein the first diffractive optical element has a relatively high diffraction efficiency and the second diffractive optical element has a relatively low diffraction efficiency and the first and second diffractive optical elements are overlaid on one another in or on the waveguide, wherein the first diffractive optical element is configured to receive light along the input direction and couple it towards the second diffractive optical element which can then act as an output diffractive optical element, providing outcoupled orders towards a viewer, and wherein the second diffractive optical element is configured to receive light along the input direction and couple it towards the first diffractive optical element which can then act as an output diffractive optical element, providing outcoupled orders towards a viewer; wherein the output diffractive optical structure comprises a first portion and a second portion, wherein in the first portion the first diffractive optical element is configured to couple light from the input direction towards the second portion and wherein the second diffractive optical element is configured to couple light from the input direction away from the second portion, and in the second portion the first diffractive optical element is configured to couple light from the input direction towards the first portion and wherein the second diffractive optical element is configured to couple light from the input direction away from the first portion.

In this way, the output diffractive optical structure can be provided with two distinct portions. In practice there may be two sides in the output diffractive optical structure: a left side and a right side, and these sides may have equal and opposite diffractive properties. It has been found that this arrangement can advantageously increase the optical efficiency of the system because light can be diffracted relatively strongly by one portion towards the other portion whereupon it is diffracted relatively strongly again such that it couples out of the waveguide towards a viewer. The diffraction efficiencies can therefore be selected to promote outcoupling of light towards a viewer, after it has been initially turned within the output structure. This means that light can be preferentially expanded in two dimensions within the output structure and coupled out of the waveguide. This contrasts with the known arrangement where some light paths can continue to be captured within the waveguide under total internal reflection without being coupled out towards a viewer. The present arrangement therefore increases the proportion of light that is coupled into useful orders and is presented to the viewer's eye. This advantageously improves the overall optical efficiency of the system which is important in a wearable device with limited battery resources because it means that battery life can be extended for the same brightness of display.

Preferably the first diffractive optical element in the first portion has a grating vector which is substantially parallel to the grating vector of the second diffractive optical element in the second portion. Likewise, the second diffractive optical element in the first portion preferably has a grating vector which is substantially parallel to the grating vector of the first diffractive optical element in the second portion. This provides strong and weak diffractive optical elements in both of the first and second portions. Preferably the features of the first and second diffractive optical elements are the mirror image of one another, reflected about an axis that is parallel with the input direction.

The first and second diffractive optical elements are preferably oriented at respective angles of +30° and −30° to the input direction. This means that the first and second diffractive optical elements can provide first diffracted orders that extend in directions respectively at angles of ±120° to the input direction. It has been found that this arrangement allows light paths to be simultaneously expanded in two dimensions within the output diffractive optical structure and coupled out of the waveguide towards a viewer.

Different respective diffraction efficiencies for the first diffractive optical element and the second diffractive optical element may be provided using features with different respective dimensions in the first and second diffractive optical elements. For example, different respective feature heights may be provided in the first and second diffractive optical elements. In this situation the first and second diffractive optical elements may be surface relief gratings. The first and second diffractive optical elements may be provided on opposite waveguide surfaces or they may be superimposed on one another on the same waveguide surface.

In another example, different feature lengths may be provided along respective axes defined by the first and second diffractive optical elements respectively. In this way, each of the first and second diffractive optical elements may be provided using features with sides that are parallel to the grooves or lines of the relevant diffractive optical element. In other words, the sides of the respective features are arranged in a direction that is orthogonal to the grating vector of the relevant diffractive optical element. In one example, the second diffractive optical element may be provided by a dotted or dashed line of elements having sides that are aligned with the respective diffractive optical elements. By contrast, the first diffractive optical element ma be provided with a continuous feature that is parallel to the grooves or lines. The lengths of the sides in the dots or dashes in the second diffractive optical element may be selected to control diffraction efficiency relative to the diffraction efficiency of the first diffractive optical element.

In a further example, a combination of different feature heights and feature lengths may be provided to yield different diffraction efficiencies for the first and second diffractive optical elements.

The output diffractive optical structure preferably comprises a plurality of optical structures arranged in an array to provide the first and second diffractive optical elements. Each of the plurality of optical structures preferably has a shape, when viewed in the plane of the waveguide, having respective sides that are parallel to the first and second diffractive optical elements and wherein the side or sides that are parallel to the first diffractive optical element have a different length to the side or sides that are parallel to the second diffractive optical element in order to provide the difference in diffraction efficiency between the first and second diffractive optical elements. Preferably the optical structures are provided within a photonic crystal. The optical structures may be provided with a refractive index that is equal to or different from (and generally higher than) the refractive index of the surrounding waveguide medium.

In one embodiment, each of the plurality of optical structures may have a parallelogram shape, when viewed in the plane of the waveguide. The major sides of the parallelogram are preferably parallel with the first diffractive optical element in the first and second portions of the waveguide and the minor sides of the parallelogram are preferably parallel with the second diffractive optical element in the first and second portions of the waveguide. The difference in size between the major and minor sides may give rise to the difference in diffraction efficiency between the first and second diffractive optical elements. This difference in size may be selected to achieve the desired difference in diffraction efficiency.

The optical structures in the first portion preferably have a shape which is a mirror image of the shape of optical structures in the second portion about an axis of reflection that is parallel with the input direction. In one embodiment, the optical structures may be parallelograms which are similar but which are presented in a different orientation in the first and second portions of the output diffractive optical element.

The input diffractive optical element is preferably positioned along a line between the first and second portions of the output diffractive optical structure. The input direction may therefore define a line that separates the first and second portions from one another.

The output diffractive optical structure may receive light directly or indirectly from the input diffractive optical element. In some arrangements an intermediate diffractive optical element may be provided between the input diffractive optical structure and the output diffractive optical structure. Such an intermediate diffractive optical structure may be included in order to provide some intermediate beam expansion before the light is received at the output diffractive optical structure.

According to another aspect of the invention there is provided an augmented reality or virtual reality device comprising: a projector configured to provide augmented reality or virtual reality images; and the optical structure as previously defined. The device may further comprise a battery configured to supply electrical power to the projector. The optical structure may enable improved optical efficiency which means that battery resources can be conserved.

Embodiments of the invention are now described, by way of example, with reference to the drawings, in which:

FIGS. 4A and 4B illustrate light paths that can be taken on interaction with a diffractive optical structure in an embodiment of the invention;

Figure 1:
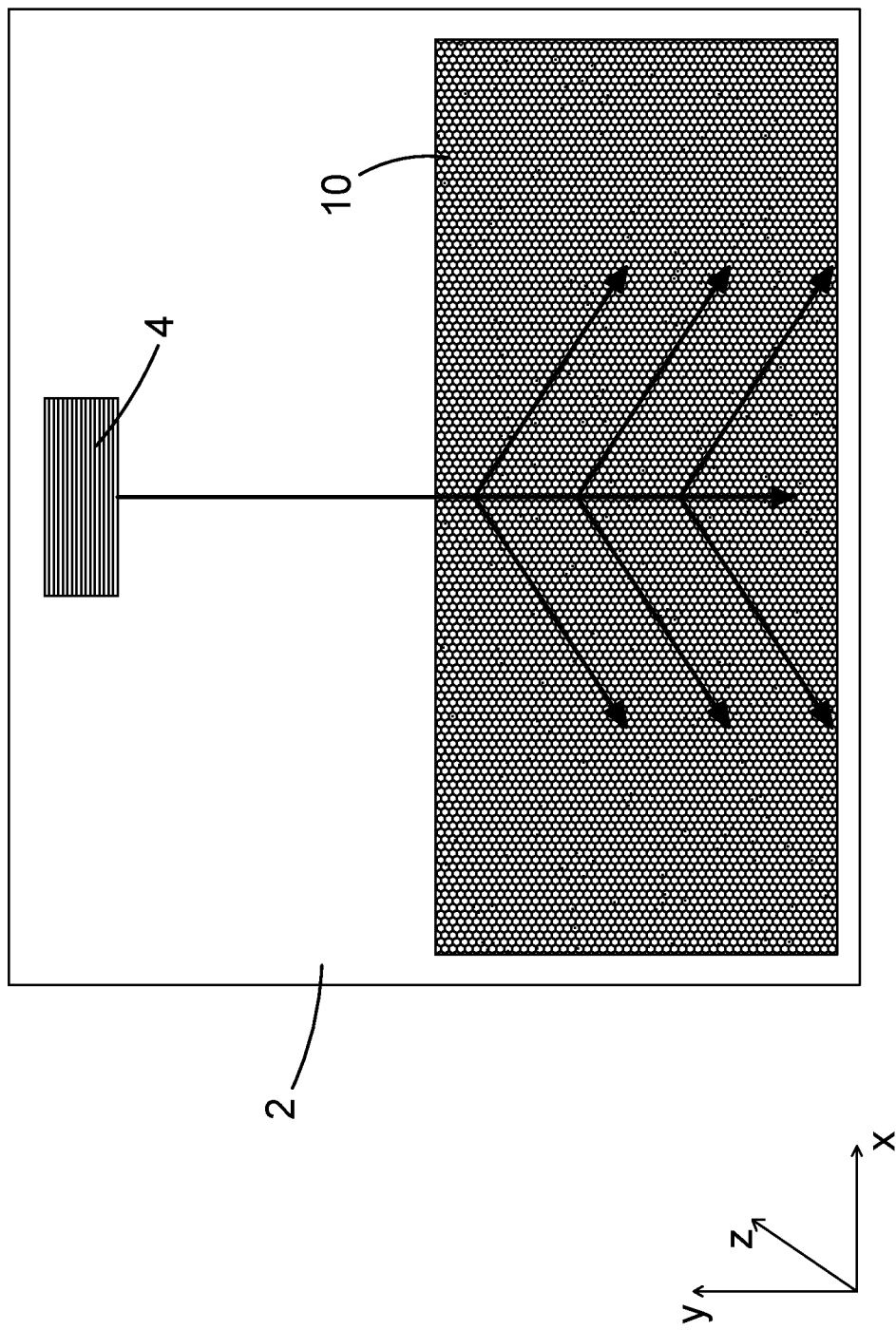
FIG. 1 is a schematic plan view of a known waveguide, which is not an embodiment of the invention.

FIG. 1 shows a schematic plan view of a waveguide 2 within a Cartesian reference frame (x, y, z). The waveguide 2 comprises two major, flat, parallel faces in the x-y plane and is made of a transparent medium, such as glass. An input diffraction grating 4 is provided on a surface of the waveguide 2 for coupling light from a projector (not shown) into the waveguide 2 by diffraction. The projector (not shown) is configured to provide light in a direction that is substantially perpendicular to the plane of the page (i.e. parallel to the z-axis). Light that is diffracted by the input grating 4 and coupled into the waveguide 2 travels by total internal reflection towards an output element in a direction that is parallel to the y-axis (in the y-z plane). The output element 10 couples light out of the waveguide 2 towards a viewer in order to provide augmented reality or virtual reality images. Light is coupled out of the output element 10 towards a viewer in a direction that is substantially perpendicular to the plane of the page (i.e. parallel to the z-axis).

The input grating 4 has a grating vector oriented along the y-axis with a magnitude that is inversely proportional to the separation of the grooves in the grating. Similarly, a grating vector can be defined for other diffraction gratings or diffractive optical structures.

The output element 10 has a structure as described in WO 2016/020643. Thus, the output element 10 includes two diffractive optical elements overlaid on one another in or on the waveguide so that each of the two diffractive optical elements can receive light from the input diffractive optical element and couple it towards the other diffractive optical element in the pair, which can then act as an output diffractive optical element which couples light out of the waveguide towards a viewer. This may be achieved by providing two diffractive optical elements overlaid on one another in a photonic crystal. In this way, the output element 10 can simultaneously expand light in two dimensions and couple light out of the waveguide towards a viewer.

Figure 2:
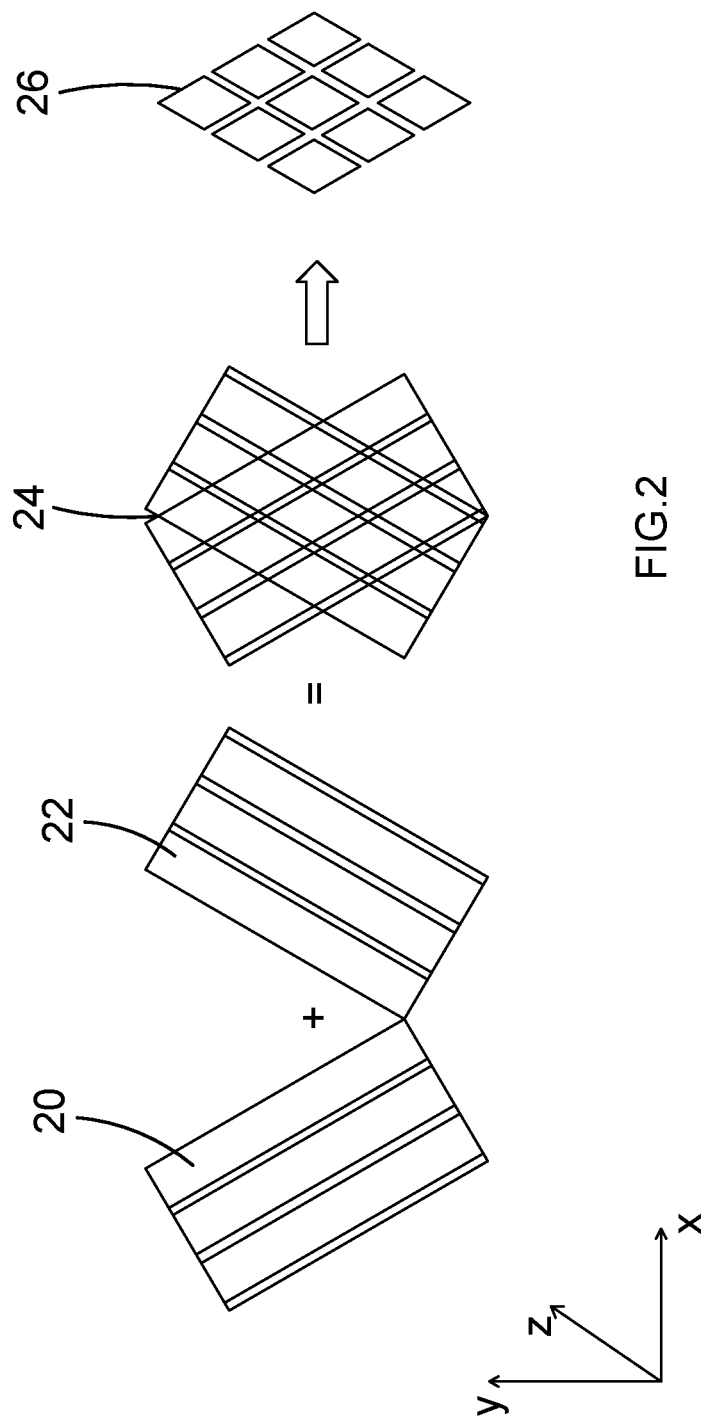
FIG. 2 is a schematic diagram showing the way in which gratings can be combined in an output element, which is not an embodiment of the invention.

In one arrangement the output element 10 can be created by superimposing two diffractive optical structures on top of one another. As shown in FIG. 2, a first diffraction grating 20 at a first angle can be superimposed on top of a second diffraction grating 22 at a second angle to provide a crossed grating 24. Alternatively the first and second diffraction gratings 22, 24 can be provided on opposite surfaces of the waveguide. In another alternative, a photonic crystal 26 can be provided with a regular array of diamond shaped structures to achieve a similar effect. In this example the first and second diffraction gratings 20, 22 and the effective diffractive optical elements in the photonic crystal 26 are provided with the same diffraction efficiency for a given wavelength. This has generally been considered important so that equal amounts of light are diffracted into a first order by the first and second diffraction gratings 20, 22 respectively within the crossed grating 24 or the photonic crystal 26. The first and second diffraction gratings 20, 22 can be provided with the same diffraction efficiency by, for example, having the same feature heights where they are provided as surface relief elements. Where a photonic crystal 26 is used the regular array of elements and the elements themselves are symmetric about the y-axis which corresponds to the input direction in which light is received at the output element 10 from the input grating 4.

It has been found that it can be advantageous to produce an output element that is composed of overlaid first and second diffraction gratings with different diffraction efficiencies for a given wavelength. As shown schematically in FIG. 3, this can be achieved by superimposing a first diffraction grating 30 and a second diffraction grating 32 which have unequal diffraction efficiencies to provide a crossed grating 34. Alternatively a digital approximation 36 to the crossed grating can be provided directly. The first diffraction grating 30 in this example provides a high diffraction efficiency at a given wavelength in comparison to the diffraction efficiency of the second diffraction grating 32. The diffraction efficiencies of the first and second diffraction gratings 30, 32 are still selected to be low in comparison to the input grating 4. This is because the input grating 4 is designed to couple light efficiently from a projector into the waveguide 2. The first and second diffraction gratings 30, 32 are designed to provide two-dimensional expansion within the waveguide and therefore they are provided with a lower diffraction efficiency so that light can expand without being immediately coupled out of the waveguide.

In these examples, the difference in diffraction efficiency can be provided by adjusting the feature height of the diffractive features in the first and second diffraction gratings 30, 32, as would be understood by a person skilled in the art. Alternatively the dimensions of the features that are parallel to the grooves or lines of the diffractive features are selectively controlled. In the digital approximation 36 the second diffraction grating is represented by "notches" in the first diffraction grating. Effectively, this provides a second diffraction grating represented by dashed lines. The reduced overall length of the features provided in the second diffraction grating versus those features in the first diffraction grating, which have a continuous length, can give rise to a difference in diffraction efficiency, even if the same feature height is used. A similar principle can be used in a photonic crystal when controlling the shape of elements within a regular array.

Figure 3:
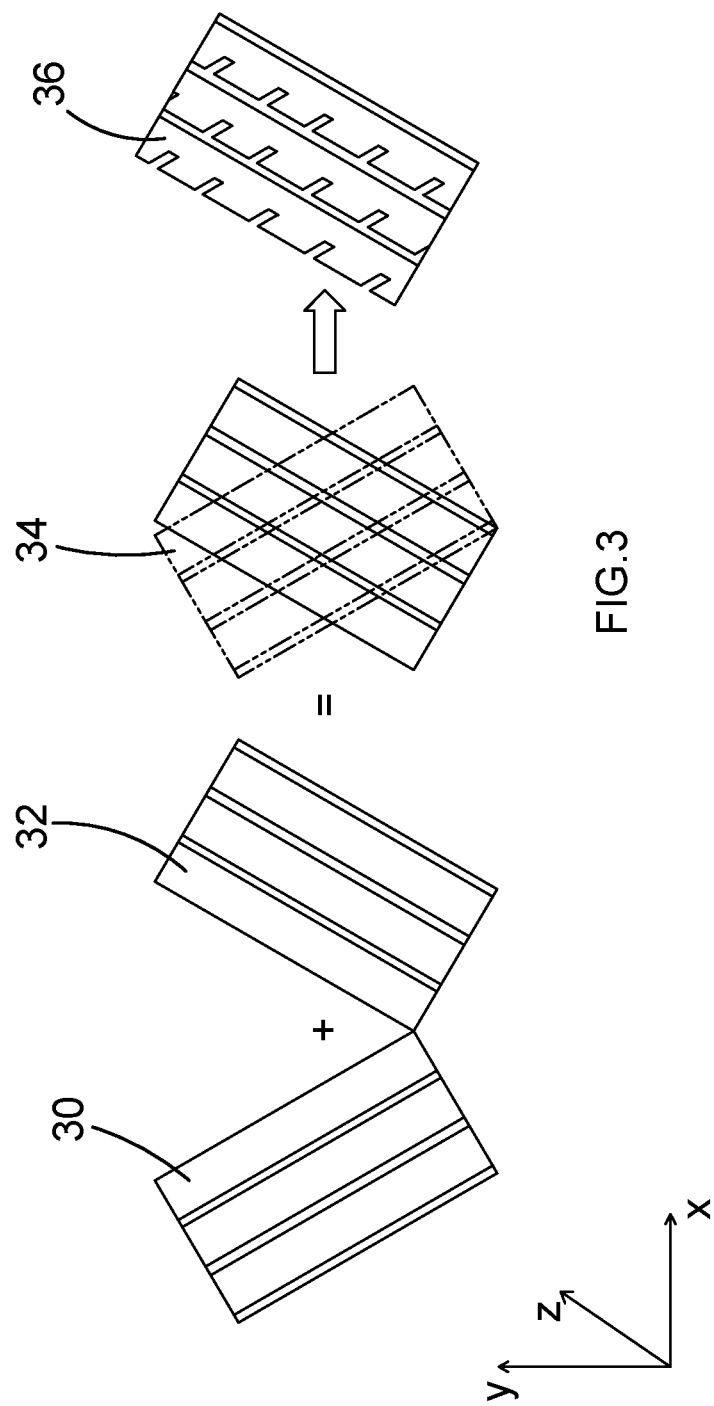
FIG. 3 is a schematic diagram showing the way in which gratings can be combined in an output element in an embodiment of the invention.

FIGS. 4A and 4B are schematic views of the interactions between a light ray and a digital approximation 40, which is a mirror image of the digital approximation 36 shown in FIG. 3, reflected about the y-axis. In FIG. 4A an incident light beam is provided in a direction that is parallel with the y-axis. The incident light beam is generally received from an input grating (not shown), and is totally internally reflected within a waveguide. Thus, the input direction of the beam is parallel with the y-axis. Upon interaction with the digital approximation 40 most of the light will be coupled into one of four orders: a zero order which continues to propagate in a direction that is parallel with the y-axis, one of two "turn" orders which are diffracted respectively by the crossed diffraction gratings within the digital approximation 40, and a "straight to eye" order which is diffracted out of the waveguide along the z-axis towards a user's eye. The "straight to eye" order is produced by an effective diffraction grating that is parallel to the x-axis and which is the resultant of the first and second diffraction gratings within the digital approximation 40. Of course, higher diffractive orders are produced as well, but the amount of light coupled into these other orders is significantly less.

With reference to FIG. 4A, it has been found that the difference in diffraction efficiency between the first diffraction grating and the second diffraction grating in the digital approximation 40 means that uneven amounts of light are coupled into the first and second turn orders. In this example the first diffraction grating (which has a higher diffraction efficiency) is oriented at −30° to the y-axis. The second diffraction grating with the lower diffraction efficiency is oriented at +30° to the y-axis. Light that is diffracted by the first diffraction grating is turned into a direction 42 that is oriented at +120° to the y-axis, at a given wavelength. Light at the same wavelength that is diffracted by the second diffraction grating is coupled in a direction 44 that is oriented at −120° to the y-axis. A higher proportion of light is coupled into the direction 42 at +120° to the y-axis, and the difference in brightness between the two paths is proportional to the difference in diffraction efficiency between the first and second diffraction gratings.

In the example of FIG. 4A a relatively small proportion of the incident light is directly diffracted out of the waveguide in a direction (not shown) towards the viewer along the z-axis. A certain amount of light is coupled into the zero order and continues to propagate within the waveguide in a direction 46 that is substantially parallel to the y-axis.

FIG. 4B shows how light interacts again with the output element 40 after it has been initially diffracted by the second diffraction grating into the direction 44 that is oriented at −120° relative to the y-axis. In this situation the light path is most strongly diffracted by the first diffraction grating so that it is coupled out of the waveguide towards a viewer in a direction (not shown) along the z-axis. Light is also diffracted by the second diffraction grating so that it is coupled into a direction 48 that is parallel with the y-axis. However, a relatively small amount of light is diffracted into this order because of the difference in diffraction efficiency between the first and second diffraction gratings. As before, a certain amount of light continues to propagate within the waveguide under total internal direction along the direction 44 of propagation which, in this case, is oriented at −120° to the y-axis.

Figure 5:
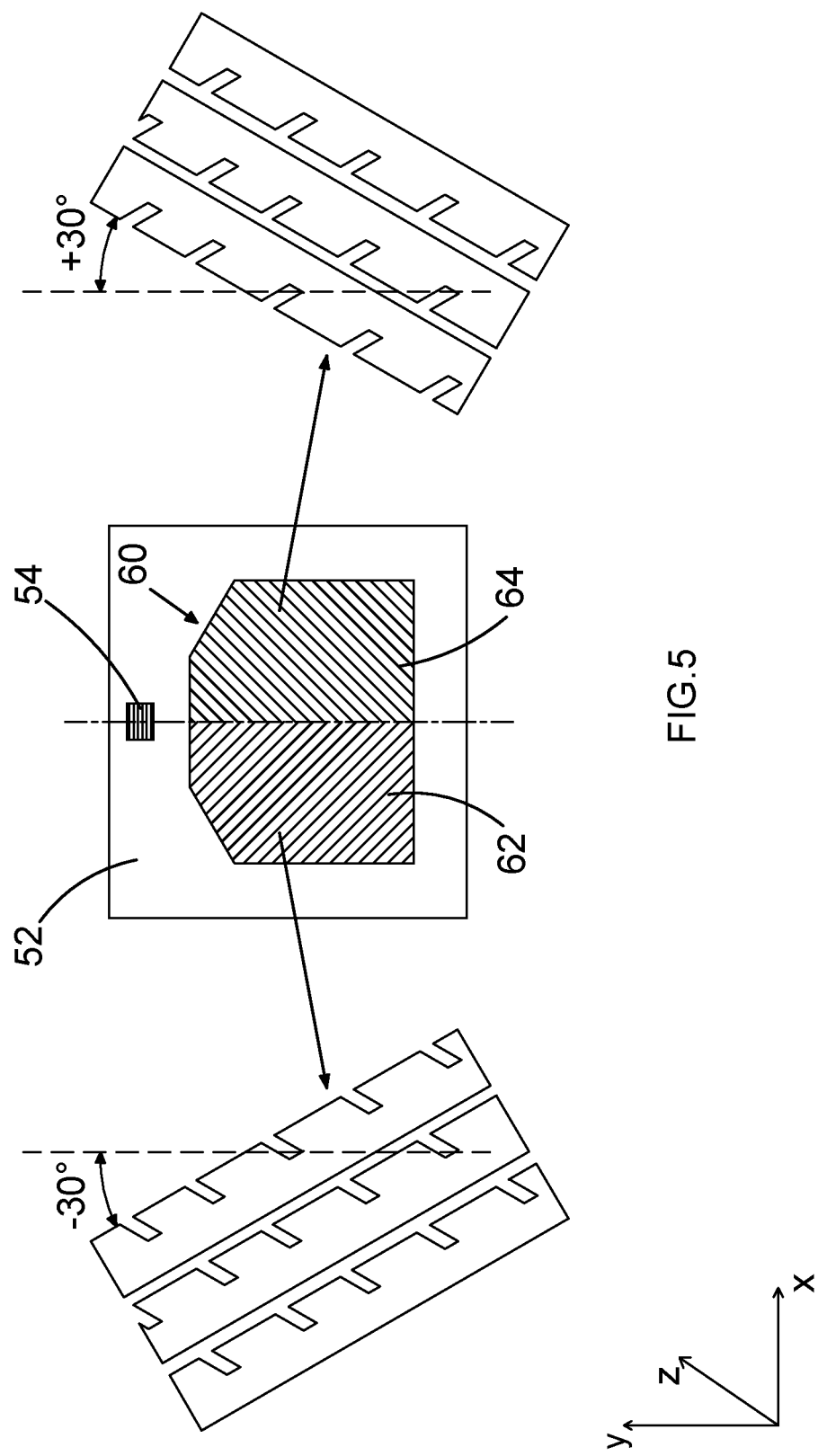
FIG. 5 is a plan view of a 2D optical structure in an embodiment of the invention.

FIG. 5 is a schematic plan view of a waveguide 52 in an embodiment of the invention. In this example, an input grating 54 is provided for coupling light into the waveguide from a projector (not shown). The light diffracted by the input grating 54 is captured within the waveguide and propagates in a direction that is parallel to the y-axis under total internal reflection. In this case, the output element 60 is split in two halves, symmetrically about the direction in which light is coupled towards the output element 60 by the input grating 54. A first portion 62 of the output element 60 is provided on the left hand side and a second portion 64 of the output element 60 is provided on the right hand side, viewed in the plane of the waveguide 52.

The diffractive features in the first and second portions 62, 64 of the output element 60 are different. In the first portion 62, the digital approximation 40 is provided, as shown in FIGS. 4A and 4B. In the second portion 64, the digital approximation 36 is provided, as shown in FIG. 3. These are digital approximations to pairs of crossed gratings having different diffraction efficiencies.

In operation, when light is received at the first portion 62 of the output element along the input direction from the input grating 54, it is diffracted into one of several orders, as described above in connection with FIGS. 4A and 4B. A significant proportion of the received light is coupled into the direction 42, which is at an angle of +120° to the y-axis. This diffracted light is directed towards the second portion 64 of the output element 60 (i.e. towards the right in the plane view of FIG. 5). A smaller proportion of the received light is coupled into the direction 44, which is at an angle of −120° to the y-axis. These orders of light are then preferentially coupled out of the waveguide 52, towards a viewer, as described above in relation to FIGS. 4A and 4B.

As explained above, a significant proportion of the light diffracted in the first portion 62 extends in the direction 42, towards the second portion 64. These light paths then encounter the diffractive structures in the second portion 64 of the output element. In this case, the first diffractive element is oriented at +30°, which is orthogonal to the path of the incoming rays. Therefore, the first diffractive element, which has the higher diffraction efficiency, is preferentially arranged to couple rays out of the waveguide 52 and towards a viewer along the z-axis.

The second portion 64 of the output element 60 is effectively a mirror image of the first portion 62, reflected about the y-axis. Therefore, opposite diffractive interactions occur within the second portion 64 in comparison to the first portion 62. When light is received at the second portion 64 from the input grating 54 along the y-axis it is preferentially diffracted into a direction at an angle of −120° to the y-axis. These diffracted orders of light extend towards the left when viewed in the plane view of FIG. 5, towards the first portion 62. A smaller proportion of light is diffracted in the second portion 64 into a direction that is at an angle of +120° to the y-axis, and these paths extend to the right in the plan view of FIG. 5. These orders are then preferentially diffracted out of the waveguide 52 and towards a viewer along the z-axis.

Light paths that are diffracted at −120° to the y-axis from the second portion 64 towards the first portion 62 are incident on the diffractive structures of the first portion. The digital approximation 40 comprises a first diffractive optical element that is oriented at −30° to the y-axis, which is in a direction that is orthogonal to the incoming rays. Thus, rays that are received at the second portion 64 are preferentially turned to the path at −120° to the y-axis and then are preferentially coupled out of the waveguide towards a viewer along the z-axis. This arrangement means that out-coupling from the waveguide 52 is more strongly promoted, following two-dimensional expansion, which advantageously improves the optical efficiency of the system. This reduces wasted light and, within an augmented reality system, means that battery life can be extended for the same brightness of output.

Figure 6:
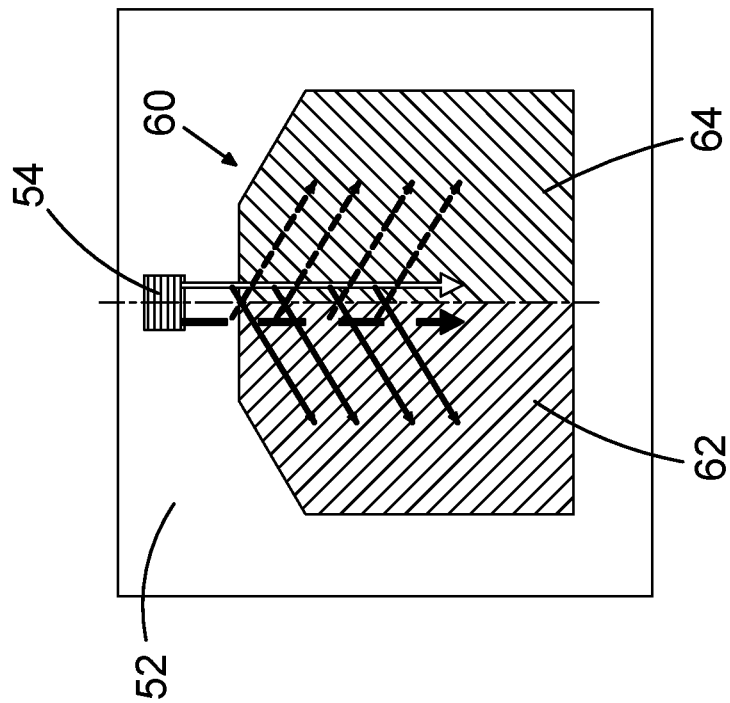
FIG. 6 illustrate light paths that can be taken in the optical structure shown in FIG. 5.
Figure 6:
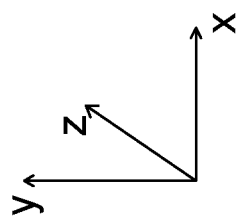

FIG. 6 is a schematic plan view of the waveguide shown in FIG. 5 showing some of the optical paths that can be taken. This diagram shows how the first and second portions 62, 64 preferentially diffract light towards one another. The received light that has already been turned is then preferentially coupled out of the waveguide towards a user. Careful selection of diffraction efficiencies can allow even illumination across the output element 60 while optimising optical efficiency.

Figure 7:
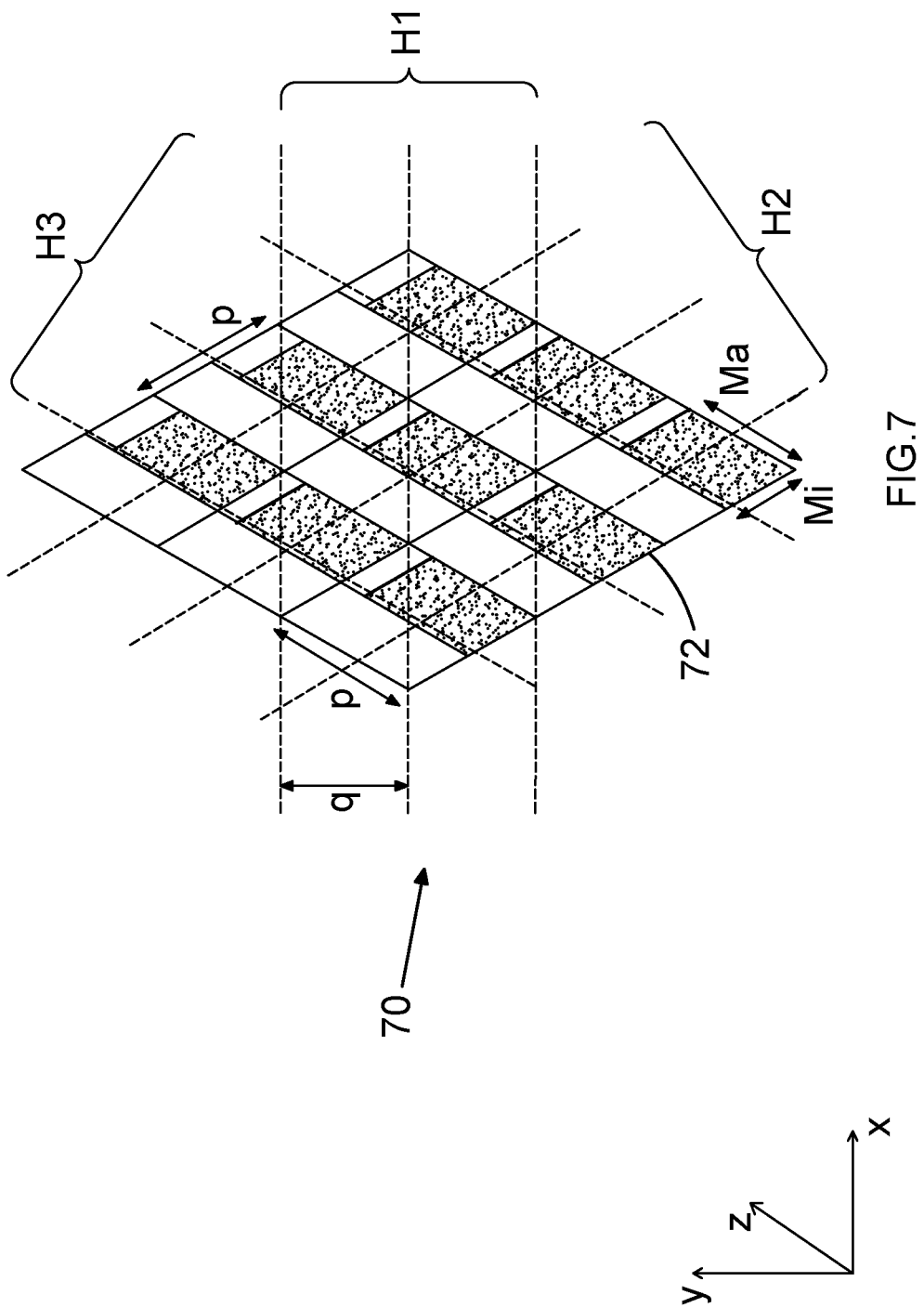
FIG. 7 is a plan view of a photonic crystal for use in an optical structure in an embodiment of the present invention.

FIG. 7 provides an example of how a photonic crystal may be structured in the second portion 64 of the output element 60, as depicted above in FIGS. 5 and 6. The photonic crystal 70 comprises a plurality of elements 72 shaped as parallelograms, when viewed in the plane of the waveguide. In one embodiment the elements 72 can be provided on one surface of the waveguide. In this arrangement the elements 72 can have a feature height so that they project from the surface of the waveguide. It has been found that an effective photonic crystal can be created with feature height in the range of 30 nm to 200 nm. Air channels can then be formed in the valleys between the elements 72. The elements 72 can have the same refractive index as the waveguide medium with n~1.5. The elements 72 are surrounded by air with a refractive index, n=1, and this mismatch in refractive index can allow diffraction. The diffraction efficiency can be controlled by applying a thin film coating on the horizontal surfaces of the elements 72. The coating material would usually (but not always) have a higher refractive index than the waveguide. In one embodiment a coating is applied with a refractive index of n~2.4.

In another embodiment the elements 72 can be embedded within the waveguide medium. The elements 72 can therefore be provided entirely within the waveguide medium. This requires a refractive index mismatch between the elements 72 and the waveguide medium in order for diffraction to occur. This can be achieved by creating a waveguide having a surface relief profile with the elements 72 on one surface. A bonding material can then be applied on the elements 72 and this can be bonded to a cover piece having the same refractive index as the waveguide. By choosing a bonding material that has a different (usually higher) refractive index than the waveguide medium a unified waveguide can be created between the original waveguide and the cover piece, with the bonding material sandwiched in between. In this design the bonding material has the same shape as the elements 72, but a different refractive index from the surrounding waveguide medium.

The regular arrangement of elements 72 in the array may be thought of as a number of effective diffraction gratings or diffractive optical structures. In particular it is possible to define a grating H2 with rows of optical structures 10 at an angle of +30° to the y-axis, with adjacent rows separated by a distance p, known as the lattice constant. Grating H3 is arranged with rows of optical structures at an angle of −30° to the y-axis, with adjacent rows separated by a distance p. Grating H1 can be defined in a direction that is aligned with the x-axis, with adjacent rows of optical structures separated by an effective distance q. Grating H1 can be thought of as a product of the combination of gratings H2 and H3. The values p and q are related to one another by the expression q=p Cos(30°). It has been found that an effective photonic crystal can be created with values of p in the range of 340 nm to 650 nm.

In the photonic crystal 70 the elements 72 have a parallelogram shape with major and minor parallel sides. The major sides have a length Ma and the minor sides have a length Mi. The major sides with length Ma align to produce the grating H3. The minor sides with length Mi align to produce the grating H2. The diffraction efficiency of the grating H3 is higher than the diffraction efficiency of the grating H2 due to the different sizes of the features that contribute to the gratings.

When light from an input grating received along the y-axis is incident on the photonic crystal 70 it undergoes multiple simultaneous diffractions by the various diffractive optical elements. Light can be diffracted into a zero order, which is a continuation of the propagation of the incident light along the y-axis. Light can also be diffracted into a first diffraction order by grating H1. The first order is coupled out of the waveguide 14 in a positive direction along the z-axis, towards a viewer which can be defined as the straight to eye order. Light can also be diffracted into a first diffracted order by the H2 diffractive optical structure. A relatively small proportion of the incident light is diffracted into this order because of the relatively low diffraction efficiency of the grating H2. The diffracted order extends in a direction that is at +120° to the y-axis, and this light beam goes on to make further interactions with the photonic crystal. Light can also be diffracted into a first diffracted order by the H3 diffractive optical structure. Light is coupled preferentially into this order because of the relatively high diffraction efficiency of the grating H3. This first order is diffracted at −120° to the y-axis, and this light beam goes on to make further interactions with the photonic crystal.

The first portion 62 of the output element 60 can include parallelogram elements 72 that are similar to those shown in FIG. 7, but which are reflected about an axis of reflection which is parallel to the y-axis. In this way, a photonic crystal can be provided in the first and second portions 62, 64 of the output element to produce an effect that is similar to that produced using overlaid gratings.

The invention claimed is:

1. An optical structure for use in an augmented reality or virtual reality display, comprising:
   a waveguide;
   an input diffractive optical structure configured to receive light from a projector and couple the received light into the waveguide; and
   an output diffractive optical structure configured to receive light propagating within the waveguide from the input diffractive optical structure in an input direction,
      the output diffractive optical structure comprising at least a first diffractive optical element and a second diffractive optical element with different respective diffraction efficiencies,
      the first diffractive optical element having a relatively high diffraction efficiency and the second diffractive optical element having a relatively low diffraction efficiency,
      the first and second diffractive optical elements being overlaid on one another in or on the waveguide,
   the first diffractive optical element being is configured to receive light along the input direction and couple it towards the second diffractive optical element which can then act as an output diffractive optical element, providing outcoupled orders towards a viewer, and
   the second diffractive optical element being configured to receive light along the input direction and couple it towards the first diffractive optical element which can then act as an output diffractive optical element, providing outcoupled orders towards a viewer;
   the output diffractive optical structure comprising a first portion and a second portion, wherein:
      in the first portion, the first diffractive optical element is configured to couple light from the input direction towards the second portion and the second diffractive optical element is configured to couple light from the input direction away from the second portion; and
      in the second portion, the first diffractive optical element is configured to couple light from the input direction towards the first portion and wherein the second diffractive optical element is configured to couple light from the input direction away from the first portion;
   the first diffractive optical element in the first portion having a grating vector which is:
      substantially parallel to a grating vector of the second diffractive optical element in the second portion; and
      not parallel to a grating vector of the second diffractive optical element in the first portion.

2. The optical structure of claim 1, wherein grooves or diffractive lines of the first and second diffractive optical elements are oriented at respective angles of +30° and −30° to the input direction.

3. The optical structure of claim 1, wherein different respective diffraction efficiencies for the first diffractive optical element and the second diffractive optical element are provided using features with different respective dimensions in the first and second diffractive optical elements.

4. The optical structure of claim 3, wherein different respective feature heights are provided in the first and second diffractive optical elements.

5. The optical structure of claim 3, wherein different respective feature lengths are provided along respective axes defined by the first and second diffractive optical elements respectively.

6. The optical structure of claim 1, wherein the output diffractive optical structure comprises a plurality of optical structures arranged in an array to provide the first and second diffractive optical elements, wherein each of the plurality of optical structures has a shape, when viewed in a plane of the waveguide, having respective sides that are parallel to the first and second diffractive optical elements and wherein the side or sides that are parallel to the first diffractive optical element have a different length to the side or sides that are parallel to the second diffractive optical element in order to provide the difference in diffraction efficiency between the first and second diffractive optical elements.

7. The optical structure of claim 6, wherein each of the plurality of optical structures has a parallelogram shape, when viewed in the plane of the waveguide, wherein major sides of the parallelogram are parallel with the first diffractive optical element in the first and second portions of the waveguide and minor sides of the parallelogram are parallel with the second diffractive optical element in the first and second portions of the waveguide.

8. The optical structure of claim 6, wherein the optical structures in the first portion have a shape which is a mirror image of the shape of optical structures in the second portion about an axis of reflection that is parallel with the input direction.

9. The optical structure of claim 1, wherein the input diffractive optical element is positioned between the first and second portions of the output diffractive optical structure.

10. An augmented reality or virtual reality device comprising:
   a projector configured to provide augmented reality or virtual reality images; and
   an optical structure comprising:
      a waveguide;
      an input diffractive optical structure configured to receive light and couple the received light into the waveguide; and
      an output diffractive optical structure configured to receive light propagating within the waveguide from the input diffractive optical structure in an input direction,
      the output diffractive optical structure comprising at least a first diffractive optical element and a second diffractive optical element with different respective diffraction efficiencies,
      the first diffractive optical element having a relatively high diffraction efficiency and the second diffractive optical element having a relatively low diffraction efficiency,
      the first and second diffractive optical elements being overlaid on one another in or on the waveguide,
      the first diffractive optical element being configured to receive light along the input direction and couple it towards the second diffractive optical element which can then act as an output diffractive optical element, providing outcoupled orders towards a viewer, and
      the second diffractive optical element being configured to receive light along the input direction and couple it towards the first diffractive optical element which can then act as an output diffractive optical element, providing outcoupled orders towards a viewer;
   the output diffractive optical structure comprising a first portion and a second portion, wherein:
      in the first portion, the first diffractive optical element is configured to couple light from the input direction towards the second portion and the second diffractive optical element is configured to couple light from the input direction away from the second portion; and
      in the second portion, the first diffractive optical element is configured to couple light from the input direction towards the first portion and wherein the second diffractive optical element is configured to couple light from the input direction away from the first portion;
   the first diffractive optical element in the first portion having a grating vector which is:
      substantially parallel to a grating vector of the second diffractive optical element in the second portion; and
      not parallel to a grating vector of the second diffractive optical element in the first portion.

11. The augmented reality or virtual reality device of claim 10 further comprising a battery configured to supply electrical power to the projector.

12. A waveguide, comprising:
   an input diffractive optical structure configured to receive light and couple the received light into the waveguide; and
   an output diffractive optical structure configured to receive light propagating within the waveguide from the input diffractive optical structure in an input direction,
      the output diffractive optical structure comprising at least a first diffractive optical element and a second diffractive optical element with different respective diffraction efficiencies,
      the first diffractive optical element having a relatively high diffraction efficiency and the second diffractive optical element having a relatively low diffraction efficiency,
      the first and second diffractive optical elements being overlaid on one another in or on the waveguide,
      the first diffractive optical element being configured to receive light along the input direction and couple it towards the second diffractive optical element which can then act as an output diffractive optical element, providing outcoupled orders towards a viewer, and
      the second diffractive optical element being configured to receive light along the input direction and couple it towards the first diffractive optical element which can then act as an output diffractive optical element, providing outcoupled orders towards a viewer;
   the output diffractive optical structure comprising a first portion and a second portion, wherein:
      in the first portion, the first diffractive optical element is configured to couple light from the input direction towards the second portion and the second diffractive optical element is configured to couple light from the input direction away from the second portion; and
      in the second portion, the first diffractive optical element is configured to couple light from the input direction towards the first portion and wherein the second diffractive optical element is configured to couple light from the input direction away from the first portion;
   the first diffractive optical element in the first portion having a grating vector which is:
      substantially parallel to a grating vector of the second diffractive optical element in the second portion; and
      not parallel to a grating vector of the second diffractive optical element in the first portion.

13. The waveguide of claim 12, wherein grooves or diffractive lines of the first and second diffractive optical elements are oriented at respective angles of +30° and −30° to the input direction.

14. The waveguide of claim 12, wherein different respective diffraction efficiencies for the first diffractive optical element and the second diffractive optical element are provided using features with different respective dimensions in the first and second diffractive optical elements.

15. The waveguide of claim 14, wherein different respective feature heights are provided in the first and second diffractive optical elements.

16. The waveguide of claim 14, wherein different respective feature lengths are provided along respective axes defined by the first and second diffractive optical elements respectively.

17. The waveguide of claim 12, wherein the output diffractive optical structure comprises a plurality of optical structures arranged in an array to provide the first and second diffractive optical elements, wherein each of the plurality of optical structures has a shape, when viewed in a plane of the waveguide, having respective sides that are parallel to the first and second diffractive optical elements and wherein the side or sides that are parallel to the first diffractive optical element have a different length to the side or sides that are parallel to the second diffractive optical element in order to provide the difference in diffraction efficiency between the first and second diffractive optical elements.

18. The waveguide of claim 17, wherein each of the plurality of optical structures has a parallelogram shape, when viewed in the plane of the waveguide, wherein major sides of the parallelogram are parallel with the first diffractive optical element in the first and second portions of the waveguide minor sides of the parallelogram are parallel with the second diffractive optical element in the first and second portions of the waveguide.

19. The waveguide of claim 18, wherein the optical structures in the first portion have a shape which is a mirror image of the shape of optical structures in the second portion about an axis of reflection that is parallel with the input direction.

20. The waveguide of claim 12, wherein the input diffractive optical element is positioned between the first and second portions of the output diffractive optical structure.

\* \* \* \* \*

UNITED STATES PATENT AND TRADEMARK OFFICE
CERTIFICATE OF CORRECTION

| | | |
|---|---|---|
| PATENT NO. | : 12,164,106 B2 | Page 1 of 1 |
| APPLICATION NO. | : 17/287479 | |
| DATED | : December 10, 2024 | |
| INVENTOR(S) | : Phelan et al. | |

It is certified that error appears in the above-identified patent and that said Letters Patent is hereby corrected as shown below:

In the Claims

In Column 10, Line 23, in Claim 1, after "being", delete "is"

Signed and Sealed this
Fourth Day of November, 2025

John A. Squires
*Director of the United States Patent and Trademark Office*